(12) United States Patent
Stuart et al.

(10) Patent No.: US 6,822,023 B2
(45) Date of Patent: Nov. 23, 2004

(54) FLAME RETARDANT POLYOLEFIN RESIN PRE-EXPANDED PARTICLES AND IN-MOLD FOAMED ARTICLES PREPARED THEREFROM

(75) Inventors: John Bready Stuart, Kingwood, TX (US); Steven Charles Skarke, Taylor Lake Village, TX (US); Tetsuya Ogita, League City, TX (US); Takema Yamaguchi, Houston, TX (US); Tomonori Iwamoto, Settsu (JP)

(73) Assignees: Kaneka Corporation, Osaka (JP); Kaneka Texas Corporation, Pasadena, TX (US)

( * ) Notice: Subject to any disclaimer, the term of this patent is extended or adjusted under 35 U.S.C. 154(b) by 162 days.

(21) Appl. No.: 09/998,170

(22) Filed: Dec. 3, 2001

(65) Prior Publication Data

US 2003/0105194 A1 Jun. 5, 2003

(51) Int. Cl.[7] .................................................. C08J 3/00
(52) U.S. Cl. .......................... 524/80; 524/100; 524/102; 526/351; 521/60; 521/94; 521/907
(58) Field of Search .......................... 524/80, 100, 102; 526/351; 521/60, 94, 907

(56) References Cited

U.S. PATENT DOCUMENTS 5,817,705 A * 10/1998 Wilkes et al. .................. 521/79
6,420,562 B2 * 7/2002 Galbo et al. ................... 546/16

* cited by examiner

*Primary Examiner*—David W. Wu
*Assistant Examiner*—William Cheung
(74) *Attorney, Agent, or Firm*—Armstrong, Kratz, Quintos, Hanson & Brooks, LLP (57) ABSTRACT

Flame retardant polyolefin pre-expanded particles made of a resin composition comprising a polyolefin resin and a sterically hindered amine ether flame retardant, which can be molded with good moldability to give in-mold foamed articles which have an excellent flame resistance and do not generate harmful gas at the time of burning.

8 Claims, 2 Drawing Sheets

FLAME RETARDANT POLYOLEFIN RESIN PRE-EXPANDED PARTICLES AND IN-MOLD FOAMED ARTICLES PREPARED THEREFROM

BACKGROUND OF THE INVENTION

The present invention relates to flame retardant polyolefin resin pre-expanded particles suitable for the production of thermal insulation materials, cushioning packaging materials, returnable delivery boxes, automobile bumper core, electrical and electronic parts and so on, particularly electrical and electronic parts, and to in-mold foamed articles prepared by in-mold foaming of the pre-expanded particles.

Polypropylene in-mold foaming products are superior in chemical resistance, heat resistance, impact resistance and distortion restoration rate after compression as compared to polystyrene in-mold foaming products. Thus they have been widely used as cushioning packaging materials, returnable delivery boxes, automobile parts such as bumper core, side impact energy absorber and floor material, and others.

In general, however, cellular molded articles of polyolefin resins have the drawback of being flammable, while they have advantages as mentioned above. In particular, cellular molded articles have a higher flammability as compared with non-cellular molded articles and easily burn.

In recent years, automobile parts, building materials, and electrical and electronic parts are strongly demanded to have flame resistance or self-extinguishing property. In order to meet the demand, investigation has been made about production of cellular molded articles imparted with flame resistance.

As a method for imparting a flame resistance to foamed articles (polyolefin foamed articles prepared by an atmospheric pressure foaming method or a pressure foaming method), there is known a method wherein a resin is incorporated with a flame retardant such as an inorganic flame retardant, a halogen-containing flame retardant or a phosphorus-based flame retardant, melt-kneaded at a temperature lower than the decomposition temperature of a thermally decomposable blowing agent and molded into a desired shape such as sheet, and the molded article is expanded by heating at a temperature higher than the melting point (softening point) of the resin and the decomposition temperature of the blowing agent.

For example, JP-A-3-269029 discloses production of flame retardant foamed articles having excellent flexibility, heat resistance, mechanical property, heat insulation property and electric property together with a high flame resistance by molding a flame retardant expandable composition comprising 100 parts by weight of a polyolefin resin, 30 to 200 parts by weight of an inorganic flame retardant such as magnesium hydroxide, 0.1 to 15 parts by weight of a blowing agent and at most 10 parts by weight of a crosslinking agent at a temperature lower than the decomposition temperature of the blowing agent, and heating the resulting molded article under pressure at a temperature higher than the melting point (softening point) of the resin and the decomposition temperature of the blowing agent to expand the molded article at an expansion ratio of 1.1 to 25.

Also, JP-A-5-331310 discloses production of flame retardant foamed articles without problems of generation of harmful gas and discoloration by, after subjecting to molding into sheets and crosslinking by means of electron beam, thermally expanding an expandable polyolefin resin composition comprising 100 parts by weight of a polyolefin resin, 1 to 40 parts by weight of a thermally decomposable blowing agent, 5 to 50 parts by weight of ammonium polyphosphate and 0.5 to 5 parts by weight of zinc stearate.

Further, JP-A-7-238178 discloses production of flame retardant foamed articles having high mechanical strength and good appearance by, after subjecting to molding into sheets and crosslinking by means of electron beam, thermally expanding a flame retardant expandable polyolefin resin composition comprising 100 parts by weight of a polyolefin resin, 5 to 200 parts by weight of a polysiloxane compound, and a blowing agent such as a thermally decomposable blowing agent or a liquefied gas blowing agent.

In JP-A-3-269029, JP-A-5-331310 and JP-A-7-238178, non-halogen flame retardants are used to provide flame retardant polyolefin foamed articles. However, since foamed articles are prepared by heating molded articles under atmospheric pressure or under pressure to decompose a decomposable blowing agent or to volatilize a volatile blowing agent to thereby foam the molded articles, the methods disclosed therein are difficult to apply to in-mold foaming wherein pre-expanded particles are filled in a mold and are fused together by heating with steam. That is to say, it is difficult to achieve good melt adhesion of the pre-expanded particles and good surface appearance by these methods. Further, since a polyolefin is crosslinked, these methods are disadvantageous from the viewpoints of cost and recycling.

It is known that additives incorporated into resins exert an influence on the cell structure of the obtained pre-expanded particles. If inorganic non-halogen flame retardants are incorporated into pre-expanded particles, a problem such as formation of combined cells or fine cells may arise, thus resulting in deterioration of moldability of the pre-expanded particles.

On the other hand, the following methods are known as a method for imparting a flame resistance to pre-expanded particles and in-mold foamed articles prepared therefrom.

For example, JP-A-4-363341 discloses a self-extinguishing foamed article wherein polyolefin expanded particles are fused together and a thermally expandable graphite powder which serves as a flame retardant are present at the adhesion interface between the expanded particles in an amount of 8 to 20% by weight based on the weight of the foamed article. This method requires a step for previously adhering the graphite powder onto the surface of the expanded particles prior to molding the particles in a mold, thereby making the graphite powder intervene at the interface between adjacent particles fused together. Therefore, not only the method is complicated, but also a problem arises that the melt adhesion of expanded particles deteriorates due to the presence of graphite powder in the surface of pre-expanded particles.

Further, JP-A-6-192465 discloses an in-mold foamed article prepared by wetting polyolefin expanded particles with an organic liquid, adding antimony trioxide and a flame retardant such as a brominated aromatic compound together with a film forming agent to the particles, mixing and sintering (fusing together) them in a conventional manner. It is disclosed that the amount of the flame retardant is from 4 to 10% by weight based on the total weight of the mixture. Working examples thereof show production of molded articles meeting a flame resistance of UL94HF-1.

JP-A-7-309967 discloses flame retardant polyolefin expanded particles which contain a bis(alkyl ether) tetrabromobisphenol A flame retardant and/or a bis(alkyl ether)tetrabromobisphenol S flame retardant and a flame retardant synergist such as antimony oxide, and which have excellent melt adhesion of particles in molding, secondary expandability and moldability as well as flame resistance (self-extinguishing property). Working examples thereof show production of molded articles having a flame retardant content of 1.7 to 5% by weight, an expansion ratio of 28 to 32 and an oxygen index of 27 to 32.

JP-A-10-147661 discloses flame retardant polyolefin pre-expanded particles containing ethylenebispentabromodiphenyl or ethylenebistetrabromophthalimide as a flame retardant and antimony oxide as a flame retardant synergist. It is disclosed that the amount of the flame retardant is from 1 to 30 parts by weight per 100 parts by weight of a polyolefin resin. Working examples thereof demonstrate production of molded articles meeting a flame resistance of UL94HF-2.

JP-A-9-227711 discloses flame retardant polyolefin expanded particles containing 1 to 20% by weight of a pentavalent phosphate compound having a brominated aromatic group or a brominated aliphatic group as a flame retardant.

However, halogen-containing flame retardants such as bromine-containing flame retardants raise a problem of generating a harmful gas such as a halogenated gas at the time of burning. At present, safety of flame retardants attracts attention from the viewpoint of environmental problem, and there is a movement to regulate the use of compounds which have a possibility of generating a harmful gas such as dioxin at the time of burning. For example, "blue angel mark" which is an ecolabel in Germany regulates the use of organic halogen-based flame retardants containing chlorine or bromine. "TCO95" which is an ecolabel in Sweden prohibits the use of organic chlorine-containing compounds and organic bromine-containing compounds with respect to plastic parts having a weight exceeding 25 g intended to use in electrical and electronic products.

Thus, flame retardation system using no bromine-containing flame retardant or the like has been desired.

JP-A-11-315067 discloses compounds of the formula:

R$^7$NH—(CH$_2$)$_3$—NR$^7$—CH$_2$CH$_2$—NR$^7$—(CH$_2$)$_3$—NHR$^7$ wherein R$^7$ is a group of the formula:

which are useful as a stabilizer for organic materials such as polyolefins. It is disclosed that these compounds are also useful as a flame retardant for organic materials such as polyolefins. However, there is no disclosure concerning application of these compounds to polyolefin pre-expanded particles and in-mold foamed articles made thereof. In-mold foaming is carried out by filling polyolefin pre-expanded particles in a mold and heating them with steam or the like to fuse them together, thereby giving polyolefin in-mold foamed articles having a desired shape. Therefore, if moldability of pre-expanded particles is poor, commercial value of the products is remarkably lowered. It is known that additives incorporated into polyolefin resins exert an influence on cell formation, e.g., shape and size of cells and combination of cells, and they may cause deterioration of in-mold moldability and mechanical property owing to formation of combined cells or fine cells, generation of color shading and hindrance to melt adhesion of pre-expanded particles. JP-A-11-315067 does not disclose any information required for the application to polyolefin pre-expanded particles and in-mold foamed articles made thereof.

It is an object of the present invention to provide flame retardant polyolefin in-mold foamed articles which can be prepared with good moldability and which do no generate harmful gas when burning.

A further object of the present invention is to provide flame retardant polyolefin in-mold foamed articles having an excellent flame resistance and physical properties comparable to non-flame-retarded polyolefin in-mold foamed articles without using halogen-containing flame retardants.

Another object of the present invention is to provide flame retardant polyolefin pre-expanded particles without using halogen-containing flame retardants, which can be molded in a mold with good moldability to give in-mold foamed articles having excellent flame resistance and physical properties.

These and other objects of the present invention will become apparent from the description hereinafter.

SUMMARY OF THE INVENTION

In accordance with the present invention, there is provided a flame retardant polyolefin pre-expanded particle made of a resin composition comprising a polyolefin resin and a sterically hindered amine ether flame retardant.

Preferably, the sterically hindered amine ether flame retardant is a compound of the formula (1):

R$^1$NHCH$_2$CH$_2$CH$_2$NR$^2$CH$_2$CH$_2$NR$^3$CH$_2$CH$_2$CH$_2$NHR$^4$ (1)

wherein R$^1$ and R$^2$ are an s-triazine moiety T of the formula (2):

in which R$^1$ is an alkyl group having 1 to 12 carbon atoms and R$^6$ is methyl group, cyclohexyl group or octyl group; and either one of R$^3$ and R$^4$ is the s-triazine moiety T represented by the formula (2) and the other is hydrogen atom.

Preferably, the flame retardant polyolefin pre-expanded particle is such that it shows two fusion peaks on a DSC curve when measured by differential scanning calorimetry and the heat of fusion QH of the peak appearing on the higher temperature side is from 1.5 to 25.0 J/g.

The present invention also provides a flame retardant in-mold foamed article prepared by in-mold foaming of the flame retardant polyolefin pre-expanded particles mentioned above.

According to the present invention, problems as encountered when using halogen-containing flame retardants, e.g., generation of toxic gas, do not arise, since a non-halogen specific sterically hindered amine ether compound is used as a flame retardant for polyolefin resins. Also, problems as encountered when using inorganic non-halogen flame retardants, e.g., deterioration of in-mold moldability of pre-expanded particles owing to formation of combined cells or fine cells, do not arise. A good flame resistance can be imparted to in-mold foamed articles, which are prepared by filling pre-expanded particles in a mold followed by heating with steam to melt-adhere them together, without impairing the melt adhesion of pre-expanded particles and the surface appearance of the foamed articles. Further, since the foamed articles are prepared by in-mold foaming of pre-expanded particles, it is possible to obtain foamed articles having a complicated shape.

DETAILED DESCRIPTION

Polyolefin resins have the advantages that they are superior in chemical resistance, heat resistance and distortion restoration rate after compression as compared to polystyrene, and are used in the present invention as a base material of the pre-expanded particles. The polyolefin resins used in the present invention are homopolymers and copolymers of 75 to 100% by weight, preferably 80 to 100% by weight, of an olefin monomer and 25 to 0% by weight, preferably 20 to 0% by weight of other monomers copolymerizable with the olefin monomer. If the content of the olefin monomer is less than 75% by weight, the characteristics brought from the olefin monomer are not sufficiently retained.

Examples of the olefin monomer are, for instance, α-olefins having 2 to 12 carbon atoms, e.g., ethylene, propylene, butene-1, isobutene, pentene-3, 3-methylbutene-1, hexene-1, 4-methylpentene-1, 3,4-dimethylbutene-1, heptene-1, 3-methylhexene-1, octene-1 and decene-1. The olefins may be used alone or in admixture thereof.

Examples of the other monomers copolymerizable with the olefin monomer are, for instance, a cyclic olefin such as cyclopentene, norbornene or 1,4,5,8-dimethno-1,2,3,4,4a,8,8a,6-octahydro-naphthalene, 5-methylene-2-norbornene, 5-ethylidene-2-norbornene, a diene such as 1,4-hexadiene, methyl-1,4-hexadiene or 7-methyl-1,6-octadiene, and the like. The other copolymerizable monomers may be used alone or in admixture thereof.

Examples of the polyolefin resins are, for instance, polyethylene resins such as high density polyethylene, medium density polyethylene, low density polyethylene and linear low density polyethylene; polypropylene resins such as propylene homopolymer and ethylene-propylene copolymer (e.g., copolymer of 1 to 15% by weight of ethylene and 99 to 85% by weight of propylene); copolymers of ethylene and/or propylene with other monomers such as propylene-butene copolymer, ethylene-propylene-butene copolymer and ethylene-propylene-diene copolymer; polybutene; polypentene; and the like. Of these, low density polyethylene, linear low density polyethylene, ethylene-propylene random copolymer having an ethylene content of 1 to 15% by weight and a propylene content of 99 to 85% by weight and ethylene-propylene-butene copolymer are preferred from the viewpoint that pre-expanded particles having a uniform closed cell structure are easily obtained.

Non-crosslinked polyolefin resins are preferred from the viewpoints of cost, recycle use and simplification of process steps.

The polyolefin resins may be used alone or in admixture thereof.

It is preferable that the polyolefin resins have a melt index (MI) of 0.1 to 50 g/10 minutes, especially 0.3 to 40 g/10 minutes. If the MI of the polyolefin resins is less than 0.1 g/10 minutes, the fluidity of the resins at the time of foaming is poor and the foaming is difficult. If the MI is more than 50 g/10 minutes, it is difficult to achieve a high expansion ratio since the fluidity is excessively high and, also, the pre-expanded particles tend to easily shrink.

The polyolefin resins may be used in combination with other thermoplastic resins, e.g., polystyrene and ionomer, as occasion demands, within the range that the characteristics of the polyolefin resins are not lost.

Preferable examples of the sterically hindered amine ether flame retardant are, for instance, compounds of the formula (1):

(1)

wherein $R^1$ and $R^2$ are an s-triazine moiety T of the formula (2):

(2)

in which $R^5$ is an alkyl group having 1 to 12 carbon atoms such as methyl group, ethyl group, propyl group, butyl group, n-pentyl group, n-hexyl group, n-heptyl group, nonyl group, decyl group, undecyl group, dodecyl group, isopropyl group, isobutyl group, sec-butyl group, tert-butyl group, 2-ethylbutyl group, isopentyl group, 1-methylpentyl group, 1,3-dimethylbutyl group, 1-methylhexyl group, isoheptyl group, 1,1,3,3-tetramethylpentyl group, 1-methylundecyl group or 1,1,3,3,5,5-hexamethylhexyl group, and $R^6$ is methyl group, cyclohexyl group or octyl group; and either one of $R^3$ and $R^4$ is the s-triazine moiety T represented by the formula (2) and the other is hydrogen atom. The sterically hindered amine ether flame retardants may be used alone or in admixture thereof.

Examples of the s-triazine moiety T represented by the formula (2) are, for instance, 2,4-bis[(1-methoxy-2,2,6,6-tetramethylpiperidine-4-yl)n-butylamino]-s-triazine, 2,4-bis[(1-cyclohexyloxy-2,2,6,6-tetramethylpiperidine-4-yl)n-butylamino]-s-triazine, 2,4-bis[(1-octyloxy-2,2,6,6-tetramethylpiperidine-4-yl)n-butylamino]-s-triazine, and the like.

Examples of the sterically hindered amine ether flame retardant (1) are, for instance, N,N',N'''-tris{2,4-bis[(1-cyclohexyloxy-2,2,6,6-tetramethylpiperidine-4-yl)n-butylamino]-s-triazine-6-yl}-3,3'-ethylenediiminopropylamine, N,N',N'''-tris{2,4-bis[(1-cyclohexyloxy-2,2,6,6-tetramethylpiperidine-4-yl)n-butylamino]-s-triazine-6-yl}-3,3'-ethylenediiminodipropylamine, N,N',N'''-tris{2,4-bis[(1-octyloxy-2,2,6,6-tetramethylpiperidine-4-yl)n-butylamino]-s-triazine-6-yl}-3,3'-ethylenediiminodipropylamine, N,N',N''-tris{2,4-bis[(1-octyloxy-2,2,6,6-tetramethylpiperidine-4-yl)n-butylamino]-s-triazine-6-yl}-3,3'-ethylenediiminopropylamine, N,N',N'''-tris{2,4-bis[(1-methoxy-2,2,6,6-tetramethylpiperidine-4-yl)n-butylamino]-s-triazine-6-yl}-3,3'-ethylenediiminopropylamine, N,N',N''-tris{2,4-bis[(1-methoxy-2,2,6,6-tetramethylpiperidine-4-yl)n-butylamino]-s-triazine-6-yl}-3,3'-ethylenediiminopropylamine, and the like. The sterically hindered amine ether flame retardants may be used alone or in admixture thereof.

The sterically hindered amine ether flame retardant is used in an amount of 1 to 20 parts by weight, preferably 2 to 10 parts by weight, per 100 parts by weight of the polyolefin resin. If the amount of the flame retardant is less than 1 part by weight, a sufficient flame resistance is hard to be obtained. If the amount is more than 20 parts by weight, the cells tend to become fine and, therefore, not only the cost increases, but also the in-mold moldability, especially surface appearance, tend to deteriorate.

The composition comprising the polyolefin resin and the sterically hindered amine ether flame retardant may further contain a filler and other additives, e.g., stabilizer, lubricant, colorant, ultraviolet absorber, antistatic agent and a flame retarding assistant such as antimony oxide, as occasion demands.

The pre-expanded particles of the present invention can be prepared from the polyolefin resin composition containing the sterically hindered amine ether flame retardant in a known manner. For example, the pre-expanded particles are prepared by melt-kneading a polyolefin resin with the flame retardant and optionally additives, forming the resulting mixture to resin particles, impregnating the resin particles with a volatile blowing agent in an aqueous dispersion medium with stirring under high temperature and high pressure conditions, and releasing the aqueous dispersion into a low pressure zone to hereby expand the particles. The bulk density of the produced pre-expanded particles is usually from about 0.01 to about 0.3 g/cm$^3$, especially about 0.015 to about 0.18 g/cm$^3$, though it varies depending on the presence or absence of a filler used optionally and the density of the resin used. The expansion ratio of the pre-expanded particles is usually from 3 to 90, especially 5 to 60. It is preferable that the proportion of closed cells in the pre-expanded particles is not less than 65%, especially not less than 80%. It is also preferable that the average cell diameter is from 50 to 1,000 µm, especially 100 to 800 µm. If the closed cell proportion is less than 65%, not only the molded articles prepared from the pre-expanded particles are easy to shrink, but also there is a tendency that the melt adhesion property is lowered since the expansion pressure in molding is not sufficient and, also, the appearance of the molded articles is impaired and the cushioning property is lowered. If the average cell diameter is less than 50 µm, it is difficult to provide the molded articles with a sufficient strength, and if the average cell diameter is more than 1,000 µm, the surface property of the molded articles tends to lower.

It is further preferable that, in addition to the characteristics as mentioned above, the pre-expanded particles of the present invention show two fusion peaks on a DSC curve when measured by differential scanning calorimetry (DSC) and the heat of fusion QH of the peak appearing on the higher temperature side is from 1.5 to 25.0 J/g. As a result of having two fusion peak temperatures, the pre-expanded particles can be molded without crosslinking the polyolefin resin. If the heat of fusion QH is less than 1.5 J/g, the dimensional shrinkage of molded articles becomes large and also the mechanical properties of molded articles such as compressive strength are lowered. If the heat of fusion is more than 25.0 J/g, the surface property of molded articles is deteriorated and the internal melt adhesion is also deteriorated to result in lowering of mechanical properties. In particular, in case of using a polypropylene resin as a polyolefin resin, it is preferable that the heat of fusion QH is from 1.5 to 25 J/g, especially 5.0 to 20.0 J/g, more especially 8.0 to 18.0 J/g.

Environment-friendly in-mold foamed articles which have an excellent flame resistance and do not generate toxic gas at the time of burning can be obtained by molding pre-expanded particles that the base resin (polyolefin resin) contains 1 to 20 parts by weight of a sterically hindered amine ether flame retardant and the heat of fusion of the high-temperature-side fusion peak is from 1.5 to 25.0 J/g.

The flame retardant polyolefin pre-expanded particles of the present invention has two fusion peak temperatures measured by DSC method. No particular limitation is required for the relationship between these two fusion peak temperatures. However, it is preferable that the difference in temperature between these two fusion peaks is from 10 to 25° C., since the pre-expanded particles are easily fused together when heated for molding in a mold. Although the two fusion peak temperatures vary depending on molecular structure of the base resin, thermal history of the resin, amount of blowing agent, expansion temperature and expansion pressure, the difference between two fusion peak temperatures becomes large if the expansion is conducted on a higher temperature side.

The two fusion peaks appearing on a DSC curve of pre-expanded particles are produced by a change of crystal state of the base resin that occurs when, upon expansion of resin particles, the base resin is heated to a temperature in the vicinity of the melting point of the resin and then quenched. As a result are obtained pre-expanded particles having two fusion peak temperatures.

Although the heat of fusion QH for the high-temperature-side peak of the pre-expanded particles varies depending on the molecular structure of resin and the amount of additives, the heat of fusion QH generally decreases with raising the expansion temperature. Pre-expanded particles having a heat of fusion QH of 1.5 to 25.0 J/g can be easily obtained by the above-mentioned method of the preparation of pre-expanded particles if the heating temperature for the pre-expansion is set within the range of from (Tm−25)° C. to (Tm+10)° C. wherein Tm is the melting point (° C.) of the particles of a base resin (i.e., polyolefin resin). The reason why the expansion temperature is set within the above range is that it is possible to suitably select an optimum expansion temperature in accordance with the kind of polyolefin resin, the amount of blowing agent used and the desired expansion ration of pre-expanded particles.

A process for preparing the flame retardant polyolefin pre-expanded particles of the present invention will be explained below.

The polyolefin resin is usually processed into a desired particulate shape so as to make it easier to use in pre-expansion, for example, by melting in extruder, kneader, Banbury mixer or roll mill, and forming into particles having a desired shape, such as column, prolate spheroid, sphere, cube or rectangular parallelopiped, and having an average particle size of 0.1 to 10 mm, preferably 0.7 to 5 mm. A flame retardant and optionally used additives are added to the molten resin in the step of preparing the resin particles.

The process for preparing the flame retardant polyolefin pre-expanded particles of the present invention is not particularly limited, and known processes are applicable. For example, the pre-expanded particles are produced by a process which comprises dispersing the flame retardant polyolefin resin particles in an aqueous dispersion medium, typically water, in a pressure vessel to form a dispersion, impregnating the particles with a blowing agent with stirring, heating the dispersion under pressure to a prescribed expansion temperature, and releasing the dispersion into a low pressure zone to thereby expand the particles.

Examples of the blowing agent are, for instance, a volatile blowing agent, e.g., an aliphatic hydrocarbon such as propane, butane, pentane, hexane or heptane, and an alicyclic hydrocarbon such as cyclobutane, cyclopentane or cyclohexane; an inorganic gas such as carbon dioxide, nitrogen gas or air; water; and the like. These blowing agents may be used alone or in admixture thereof. The amount of the blowing agent is not particularly limited, and is suitably selected according to a desired degree of expansion of the pre-expanded particles to be produced. In case of the aliphatic or alicyclic hydrocarbon blowing agent, the blowing agent is generally used in an amount of 5 to 50 parts by weight per 100 parts by weight of the flame retardant polyolefin resin particles.

In the preparation of an aqueous dispersion of polyolefin particles, a dispersing agent such as calcium tertiary phosphate, basic magnesium carbonate or calcium carbonate may be used. A small amount of a surfactant such as sodium dodecylbenzenesulfonate, sodium n-paraffinsulfonate or sodium α-olefinsulfonate may also be used as a dispersing aid. These may be used alone or in admixture thereof. The amounts of such dispersing agent and surfactant vary depending on the kinds thereof and the kind and amount of the polyolefin particles used. Usually the amount of dispersing agent is from 0.2 to 3 parts by weight per 100 parts by weight of water, and the amount of surfactant is from 0.001 to 0.1 part by weight per 100 parts by weight of water.

The flame retardant polyolefin particles to be dispersed into an aqueous dispersion medium such as water is generally used in an amount of 20 to 100 parts by weight per 100 parts by weight of water in order to achieve good dispersion into water.

Usually the flame retardant polyolefin particles are introduced into a pressure vessel with water and a blowing agent to form an aqueous dispersion of the particles, and impregnated with the blowing agent at an elevated temperature, e.g., a temperature higher than the softening point of the polyolefin resin used. The dispersion of the particles containing a blowing agent is then heated under pressure to an expansion temperature in the pressure vessel, and then released from the vessel into an atmosphere of lower pressure through an orifice having openings with a diameter of 2 to 10 mm, thereby expanding the polyolefin resin particles to give the flame retardant polyolefin pre-expanded particles of the present invention. The expansion temperature varies depending on the kind of flame retardant polyolefin particles used and a desired value of the heat of fusion QH for the high-temperature side fusion peak of the flame retardant polyolefin pre-expanded particles to be produced, so it cannot be determined unconditionally. As noted above, however, if the melting point (fusion peak temperature) of the flame retardant polyolefin particles used as measured by DSC is Tm(° C.), the heating temperature for the pre-expansion is selected within the range of about (Tm−25) to about (Tm+10)° C. If the expansion temperature is within the above range, pre-expanded particles having two fusion peak temperatures measured by DCS method and a heat of fusion QH of 1.5 to 25.0 J/g with respect to the high-temperature side peak can be easily obtained.

The expansion pressure is selected primarily according to the prescribed expansion ratio, and is generally from 0.78 to 4.90 MPa.

There is no particular limitation in the pressure vessel used, and any vessel can be used so long as it can withstand the pressures and temperatures noted above. Representative vessel is an autoclave type pressure vessel.

Production of in-mold foamed articles from the pre-expanded particles of the present invention is carried out, for example, in accordance with a known in-mold foaming method as disclosed in JP-B-51-22951 and JP-B-6-59694, by filling the pre-expanded particles in a mold capable of being closed but incapable of being hermetically sealed, and heating the particles with steam or the like to fuse them together, thus giving cellular molded articles true to the mold.

In the above molding method, it is preferable to provide the particles with a gas pressure before filling the pre-expanded particles in a mold, or to fill the pre-expanded particles in a mold in the state of being compressed at a compression rate of 10% or more.

In the former case, the desired gas pressure can be imparted to the pre-expanded particles by holding the pre-expanded particles under pressure of an inorganic gas. Examples of the inorganic gas are, for instance, air, nitrogen, helium, neon, argon or carbon dioxide gas. These gases may be used alone or in admixture thereof. Of these, air and nitrogen gas are preferable from the viewpoint of versatility.

In the latter case, the pre-expanded particles are compressed at a compression rate of 10% or more by a pressurized gas and filled in a mold in that state. The compression rate of the pre-expanded particles is a value obtained by dividing a weight of flame retardant polyolefin pre-expanded particles when filled under atmospheric pressure in a mold of a molding machine by a weight of the pre-expanded particles when filled in the compressed state in the mold, and is represented by the following equation:

$$\text{Compression rate} = \left(1 - \frac{\text{Weight of pre-expanded particles when filled under atmospheric pressure}}{\text{Weight of pre-expanded particles when filled in the compressed state}}\right) \times 100$$

After filling the pre-expanded particles in a mold in a manner as mentioned above, the pre-expanded particles are fused together by heating with steam of about 0.06 to about 0.42 MPa to give a desired in-mold foamed article.

The thus obtained in-mold foamed articles have excellent flame resistance, surface appearance, cushioning property and mechanical properties such as impact strength and, therefore, can be suitably used in various fields, particularly in a field which requires a flame resistance or a self-extinguishing property, e.g., automobile parts and building materials.

The DSC method used in the present invention is explained below.

The measuring instrument may be an ordinary differential scanning calorimeter such as model DSC-7 made by Perkin-Elmer. The measurement of the melting point (fusion peak) Tm(° C.) of the base resin of the flame retardant polyolefin pre-expanded particles is carried out by using a differential scanning calorimeter as mentioned above with a sample of 1 to 10 mg of a polyolefin resin under conditions that the temperature is elevated to 210° C. at a temperature elevation speed of 10° C./minute, then dropped to 40° C. at a temperature dropping speed of 10° C./minute and elevated again to 210° C. at a temperature elevation speed of 10° C./minute. The temperature at a peak appearing in the thus obtained DSC curve denotes the melting point Tm.

Figure 1:
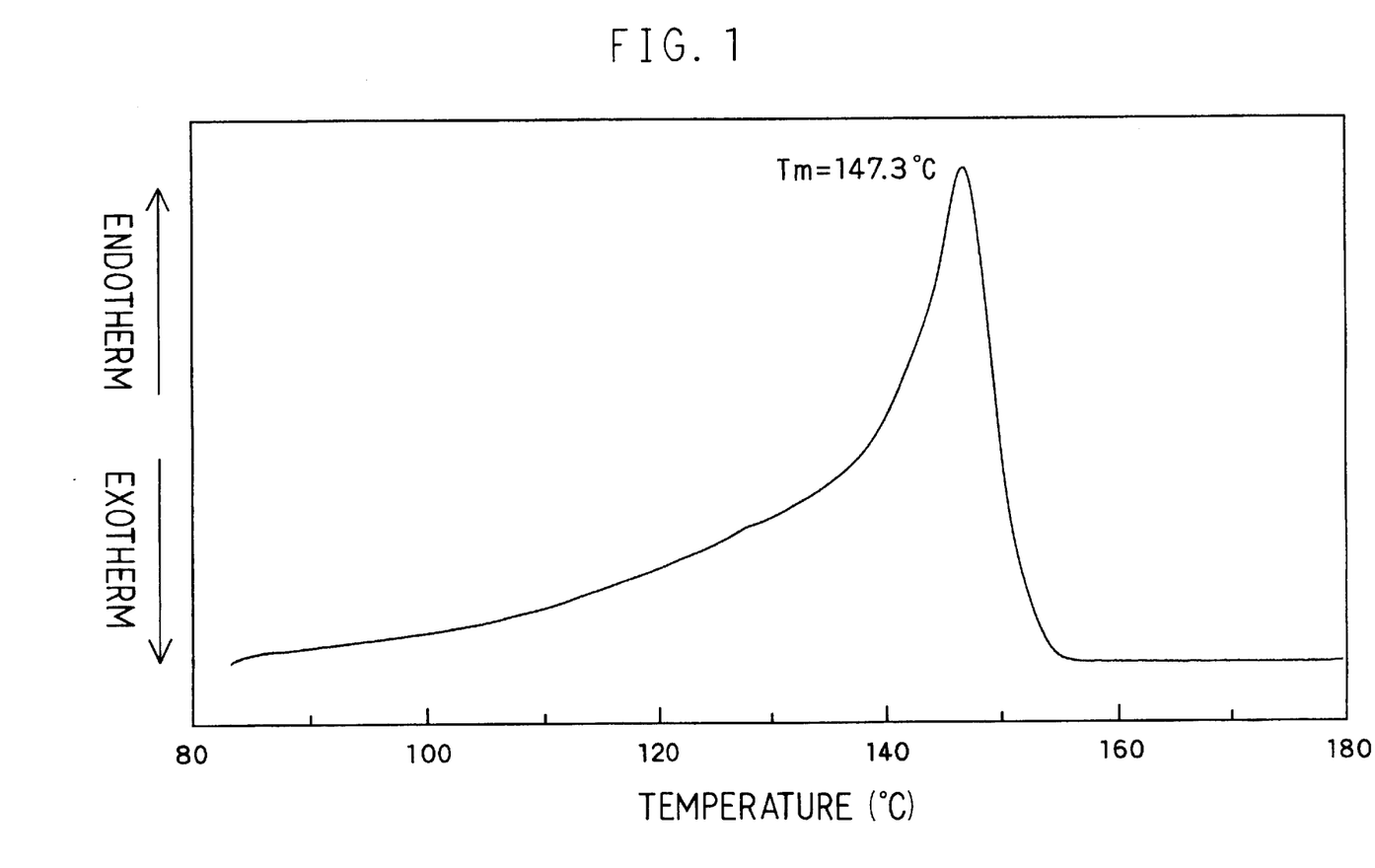
FIG. 1 is a DSC curve obtained to measure the melting point (Tm) by using, as a polyolefin resin, 4.2 mg of particles of a propylene-ethylene random copolymer having an ethylene content of 2.5% by weight and a melt index MI of 6.0 g/10 minutes.

FIG. 1 shows an example of a result of measurement of melting point (Tm) of particles of a polyolefin resin wherein an ethylene-propylene random copolymer having an ethylene content of 2.5% by weight is used as the polyolefin resin.

Figure 2:
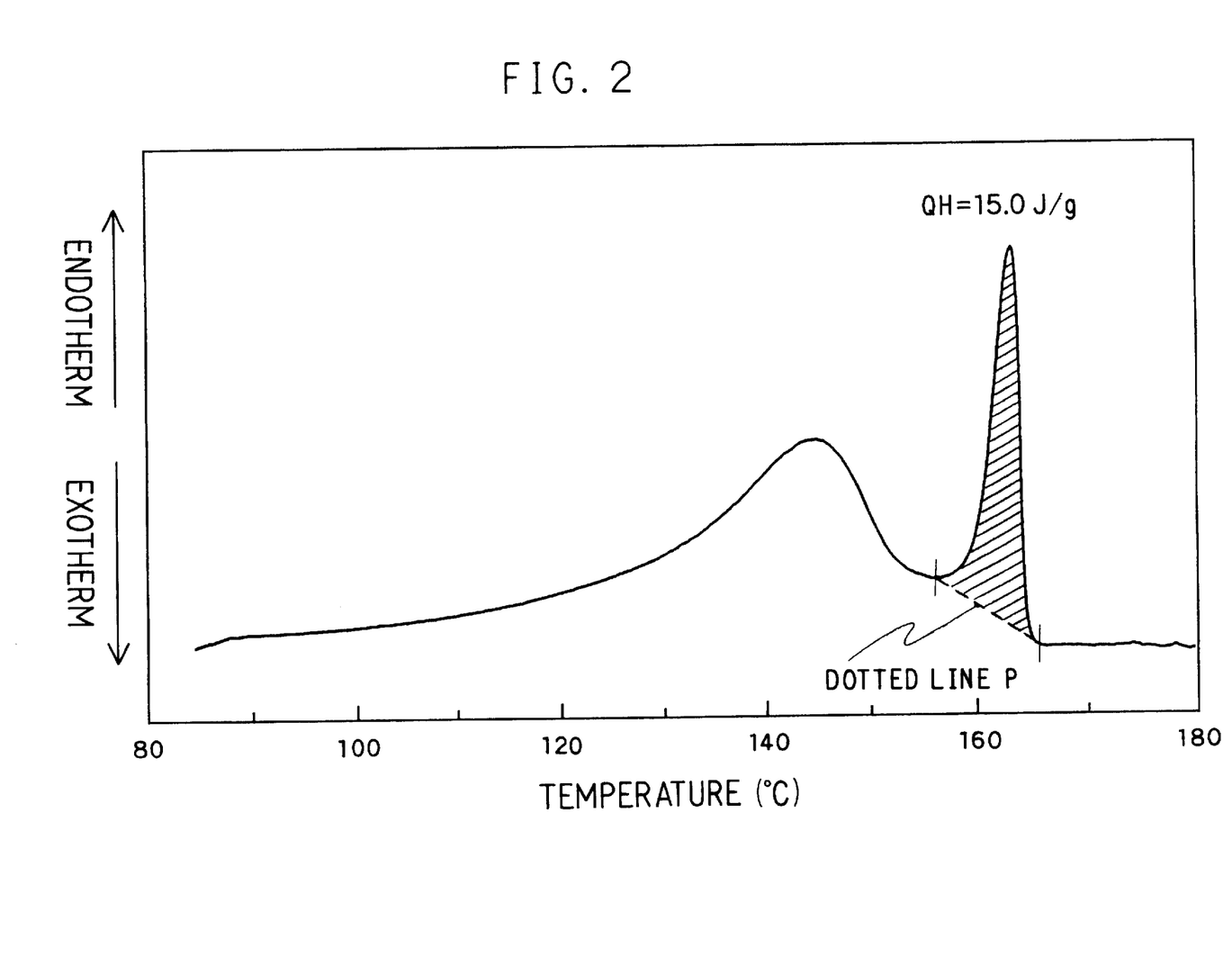
FIG. 2 is a graph illustrating a method of determining the heat of fusion QH for the peak appearing on the higher temperature side in a DSC curve measured with respect to flame retardant pre-expanded particles of a polypropylene resin prepared in Example 1 wherein a straight line P is a tangential line drawn from the point where the slope of the curve becomes zero between the low temperature side peak and the high temperature side peak to the curve at the point where the high temperature side peak ends.

The heat of fusion QH of flame retardant polyolefin pre-expanded particles is obtained from a DSC curve measured by elevating the temperature to 210° C. at a temperature elevation speed of 10° C./minute using a differential scanning calorimeter as mentioned above and a sample of 1 to 10 mg of the pre-expanded particles. A tangential line (dotted line P shown in FIG. 2) for determining the heat of fusion QH is drawn from the point where the slope of the curve becomes 0 between the low-temperature side peak and the high-temperature side peak to the curve at the point where the high-temperature side peak ends. In FIG. 2 is shown a fusion curve obtained by differential scanning calorimetry of polypropylene pre-expanded particles prepared in Example 1 from the polypropylene resin particles indicated in FIG. 1 in order to illustrate a manner of measuring the heat of fusion QH of the high-temperature-side fusion peak.

The present invention is more specifically described and explained by means of examples and comparative examples, in which all parts are by weight unless otherwise noted. It is to be understood that the present invention is not limited to these examples.

Evaluation in the examples and comparative examples was made by the following methods.

Heat of Fusion QH

The measurement was made by using a differential scanning calorimeter Model DSC-7 made by Perkin-Elmer and 1 to 10 mg of polyolefin pre-expanded particles as a sample. A DSC curve was obtained by elevating the temperature to 210° C. at a temperature elevation speed of 10° C./minute, and a tangential line (straight line P) was drawn from the point where the slope of the DSC curve became 0 between the low-temperature side peak and the high-temperature side peak to the curve at the point where the high-temperature side peak ended. The quantity of heat was obtained from the area enclosed by the curve and the tangential line, and therefrom was obtained the quantity of heat per unit weight.

Bulk Density

Ten liters of dried pre-expanded particles were filled in a container having a volume of 10,000 $cm^3$, and the weight (W g) of the particles was exactly measured. The bulk density (D $g/cm^3$) of the pre-expanded particles was calculated according to the following equation: D=W/10,000.

Average Cell Diameter

Thirty pre-expanded particles were randomly taken out of prepared pre-expanded particles. The diameters of cells were measured according to JIS K 6402 and the average cell diameter was calculated therefrom.

Rate of Closed Cells

The volume of closed cells of a pre-expanded particle was measured by using an air comparison type density meter Model 930 made by Beckman. The apparent volume of the pre-expanded particle was measured by an ethanol dipping method. The rate of closed cells is calculated by dividing the closed cell volume by the apparent volume.

Rate of Melt Adhesion of Particles

After forming a notch with a knife in the surface of a molded article, the molded article was split along the line of the notch by bending the molded article. The broken surface was observed and the percentage of broken particles to the whole particles was obtained. Evaluation was made according to the following criteria. A melt adhesion rate of at least 60% is usually satisfactory for molded articles.

◎: Percentage of broken particles is at least 80%
○: Percentage of broken particles is 60% to less than 80%
X: Percentage of broken particles is less than 60%

Dimensional Shrinkage

The dimensions of a molded article were measured using a caliper, the shrinkage percentage relative to the mold dimensions was calculated, and evaluation was made according to the following criteria.

○: Shrinkage percentage of less than 3%
Δ: Shrinkage percentage of 3% to less than 5%
X: Shrinkage percentage of not less than 5%

Flame Resistance

The flame resistance was measured according to UL-94 horizontal testing method and was evaluated according to the following criteria.

◎: Pass HF-1
○: Pass HF-2
X: Not pass HF-2

Surface Appearance

The surface of a molded article was visually observed and evaluated according to the following criteria.

○: There is no irregularity in the surface and there is little gap between adjacent particles
X: There is an irregularity in the surface, and gaps between respective particles are very large.

EXAMPLES 1 TO 7 AND COMPARATIVE EXAMPLES 1 to 3

One hundred parts of an ethylene-propylene random Copolymer (ethylene content 2.5% by weight, MI 6.0 g/10 minutes) was mixed with a sterically hindered amine ether flame retardant (trade mark "CGL116" made by Ciba Specialty Chemicals) of the formula (3):

$$RNHCH_2CH_2CH_2NRCH_2CH_2NHCH_2CH_2CH_2NHR \quad (3)$$

wherein R is a group of the formula:

and carbon black as a coloring agent in amounts shown in Table 1. The resulting mixture was kneaded by a single screw extruder and formed into resin particles having a weight of 1.8 mg/particle. The melting point of the obtained resin particles was 147.3° C.

A 10 liter pressure vessel was charged with 100 parts of the resin particles, 9.3 parts of isobutane and a dispersion medium (i.e., 300 parts of water containing 2.0 parts of powdery basic calcium tertiary phosphate and 0.05 part of sodium n-paraffinsulfonate). The resulting aqueous dispersion was heated to an expansion temperature shown in Table 1. The pressure inside the vessel was then adjusted to a prescribed expansion pressure within the range of 1.30 to 1.69 MPa by introducing isobutane to the vessel. A valve provided at a lower part of the pressure vessel was opened and, while maintaining the pressure inside the vessel at that pressure by introducing a nitrogen gas, the aqueous dispersion was released into the atmosphere through an orifice plate having openings of 4.0 mm diameter to give pre-expanded particles. The pre-expanded particles were evaluated.

The pre-expanded particles were placed in a pressure vessel and compressed by air pressure, and the compressed particles were filled in a mold having a size of 450×300×60 mm at a compression rate of at least 10%. The particles were then heated for 10 seconds with steam of 0.24 to 0.40 MPa to fuse them together. The obtained in-mold foamed article was evaluated.

The results are shown in Table 1.

TABLE 1

| | Additive (Part) | | Expansion temp. (° C.) | Pre-expanded particles | | | | In-mold foamed article | | | | |
|---|---|---|---|---|---|---|---|---|---|---|---|---|
| | | | | Heat of fusion QH (J/g) | Bulk density (g/cm$^3$) | Cell diameter ($\mu$m) | Closed cell rate (%) | Density (g/cm$^3$) | Melt adhesion | Dimensional shrinkage | Flame resistance | Surface appearance |
| | CGL 116 | carbon black | | | | | | | | | | |
| Ex.1 | 2 | 0.3 | 146.5 | 15.0 | 0.033 | 286 | 98.8 | 0.040 | ⊚ | ○ | ⊚ | ○ |
| Ex.2 | 2 | 0.3 | 146.7 | 15.0 | 0.040 | 292 | 98.4 | 0.048 | ⊚ | ○ | ⊚ | ○ |
| Ex.3 | 2 | 0.3 | 146.1 | 17.0 | 0.051 | 265 | 98.6 | 0.061 | ○ | ○ | ○ | ○ |
| Ex.4 | 2 | 0.3 | 147.5 | 15.6 | 0.063 | 284 | 98.2 | 0.077 | ○ | ○ | ○ | ○ |
| Ex.5 | 5 | 0.3 | 146.1 | 16.7 | 0.032 | 270 | 98.6 | 0.038 | ○ | ○ | ⊚ | ○ |
| Ex.6 | 10 | 0.3 | 146.1 | 9.5 | 0.023 | 254 | 98.2 | 0.027 | ⊚ | ○ | ⊚ | ○ |
| Ex.7 | 10 | 0.3 | 146.1 | 14.5 | 0.045 | 226 | 98.4 | 0.054 | ⊚ | ○ | ⊚ | ○ |
| Com. Ex.1 | 0 | 0.3 | 146.5 | 14.8 | 0.038 | 320 | 98.6 | 0.045 | ⊚ | ○ | X | ○ |
| Com. Ex.2 | 2 | 0.3 | 151.0 | 1.4 | 0.037 | 296 | 98.2 | 0.044 | ⊚ | X | ○ | ○ |
| Com. Ex.3 | 2 | 0.3 | 142.5 | 25.9 | 0.038 | 230 | 98.4 | 0.046 | X | ○ | ⊚ | X |
| Com. Ex.4 | 25 | 0.3 | 146.1 | 13.2 | 0.046 | 165 | 96.7 | 0.055 | X | Δ | ⊚ | X |

What we claim is:

1. A flame retardant polyolefin pre-expanded particle made of a resin composition comprising a polyolefin resin and a sterically hindered amine ether flame retardant.

2. The pre-expanded particle of claim 1, wherein said sterically hindered amine ether flame retardant is a compound of the formula (1):

wherein $R^1$ and $R^2$ are an s-triazine moiety T of the formula (2):

in which $R^5$ is an alkyl group having 1 to 12 carbon atoms and $R^6$ is methyl group, cyclohexyl group or octyl group; and either one of $R^3$ and $R^4$ is the s-triazine moiety T represented by the formula (2) and the other is hydrogen atom.

3. The pre-expanded particle of claim 1, wherein the amount of said flame retardant is from 1 to 20 parts by weight per 100 parts by weight of said polyolefin resin.

4. The pre-expanded particle of claim 1, wherein said polyolefin resin is a polypropylene resin.

5. A flame retardant polyolefin pre-expanded particle made of a resin composition comprising a polyolefin resin and a sterically hindered amine ether flame retardant, wherein said pre-expanded particle shows two fusion peaks on a DSC curve when measured by differential scanning calorimetry, and the heat of fusion QH of the peak appearing on the higher temperature side is from 1.5 to 25.0 J/g.

6. The pre-expanded particle of claim 5, wherein said polyolefin resin is a polypropylene resin.

7. An in-mold foamed article prepared by in-mold foaming of the flame retardant polyolefin pre-expanded particles of claim 1.

8. An in-mold foamed article prepared by in-mold foaming of the flame retardant polyolefin pre-expanded particles of claim 5.

* * * * *